(12) United States Patent
Anderson et al.

(10) Patent No.: US 10,027,887 B1
(45) Date of Patent: Jul. 17, 2018

(54) DYNAMIC 3D PANORAMAS

(71) Applicant: Google LLC, Mountain View, CA (US)

(72) Inventors: Robert Anderson, Seattle, WA (US); Carlos Hernandez Esteban, Kirkland, WA (US)

(73) Assignee: Google LLC, Mountain View, CA (US)

( * ) Notice: Subject to any disclaimer, the term of this patent is extended or adjusted under 35 U.S.C. 154(b) by 511 days.

(21) Appl. No.: 14/609,606

(22) Filed: Jan. 30, 2015

(51) Int. Cl.
H04N 7/00 (2011.01)
H04N 5/232 (2006.01)

(52) U.S. Cl.
CPC ..... H04N 5/23238 (2013.01); H04N 5/23296 (2013.01)

(58) Field of Classification Search
None
See application file for complete search history.

(56) References Cited

U.S. PATENT DOCUMENTS

| | | |
|---|---|---|
| 6,323,858 B1 | 11/2001 | Gilbert et al. |
| 6,331,869 B1 | 12/2001 | Furlan et al. |
| 2005/0099494 A1 | 5/2005 | Deng et al. |
| 2008/0291217 A1 | 11/2008 | Vincent et al. |
| 2009/0022422 A1* | 1/2009 | Sorek .............. G06T 3/4038 382/284 |
| 2012/0155786 A1* | 6/2012 | Zargarpour ........... G03B 35/08 382/284 |
| 2013/0135428 A1 | 5/2013 | Choi |
| 2013/0155181 A1* | 6/2013 | Williams ............. G09B 29/106 348/36 |
| 2013/0229484 A1* | 9/2013 | Furumura .......... H04N 5/23238 348/36 |
| 2015/0125091 A1* | 5/2015 | Gallo ................... G06T 3/0068 382/275 |

OTHER PUBLICATIONS

Garg, Rahul, and Steven M. Seitz. "Dynamic Mosaics." In 3D Imaging, Modeling, Processing, Visualization and Transmission (3DIMPVT), 2012 Second International Conference on, pp. 65-72. IEEE, 2012.

* cited by examiner

Primary Examiner — Janese Duley
(74) Attorney, Agent, or Firm — Lerner, David, Littenberg, Krumholz & Mentlik, LLP

(57) ABSTRACT

The technology relates to transitioning between panoramic imagery and the imagery from which the panoramic imagery was generated. Individual images of a portion of a scene may be combined to create a panoramic image of the entire scene. The individual images may be associated with the portion of the panoramic image which they form. The full panoramic image may then be displayed. Based on user input, a portion of the panoramic image may be zoomed-in on, and the individual image associated with that portion of the panoramic image may be displayed.

20 Claims, 9 Drawing Sheets

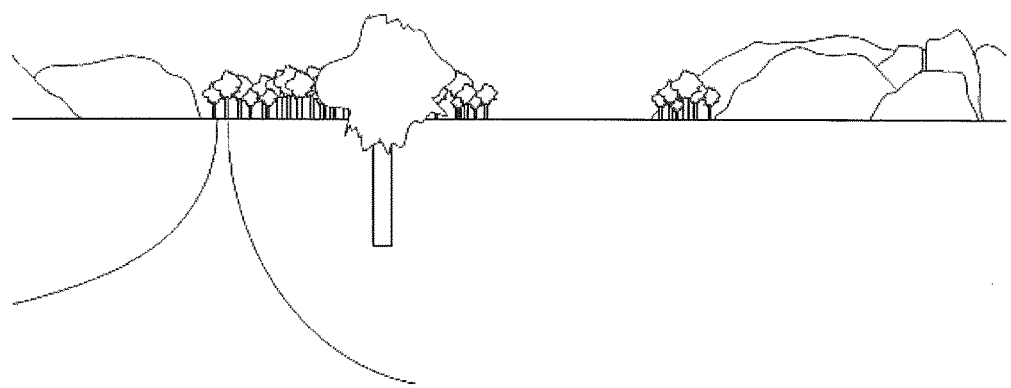
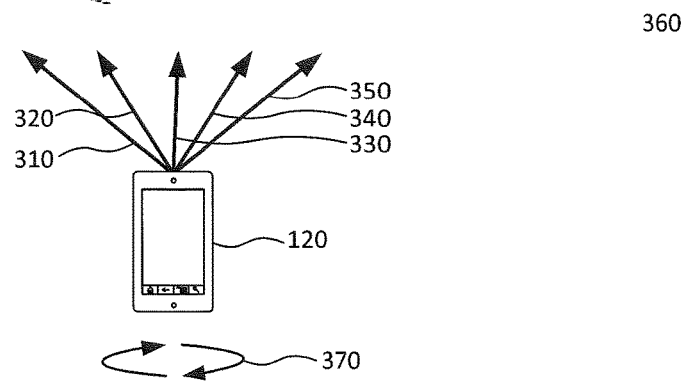
300
FIGURE 3
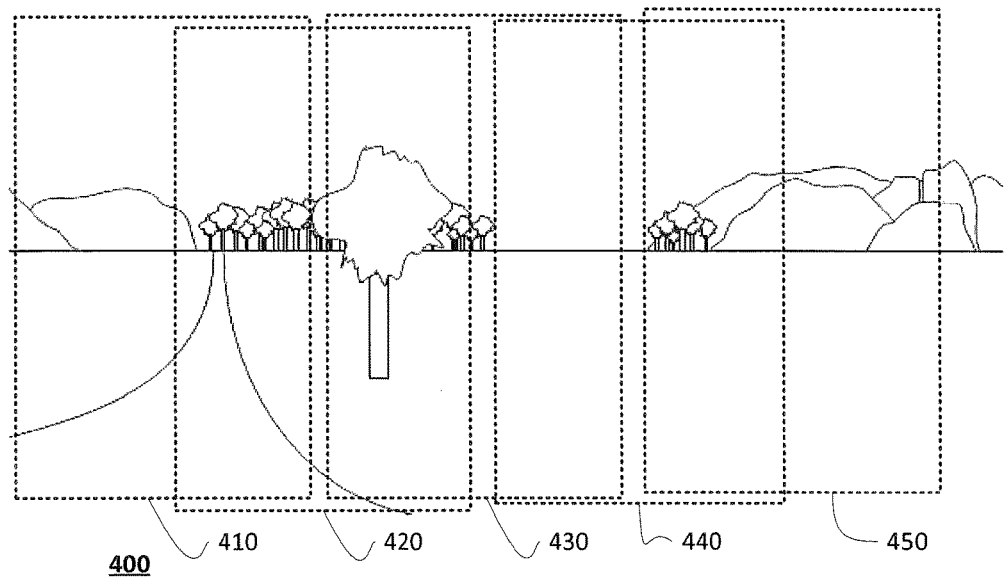
400
FIGURE 4

600

700

900

800

1100

1200

DYNAMIC 3D PANORAMAS

BACKGROUND

Panoramic images may be created by stitching together multiple images depicting smaller portions of a scene together. The stitching may result in artifacts and deformities appearing in the panoramic image that were not in the images that were stitched together. As such, the panoramic image may not be as accurate a portrayal of the scene as the original images.

SUMMARY

Embodiments within the disclosure relate generally to presenting images. One aspect includes a method for displaying a third image of a scene on a device. A first portion of the third image may be based at least in part on a first image depicting a first portion of the scene, and where a second portion of the third image may be based at least in part on a second image depicting a second portion of the scene; receiving an instruction to zoom in the display of the third image; zooming, with one or more processors, in a portion of the third image; displaying on the device, with the one or more processors and after the zooming starts, the first image when the zoomed-in portion of the third image is the first portion; displaying on the device, with the one or more processors and after the zooming starts, the second image when the zoomed-in portion of the third image is the second portion. The features of the first and second image may be displayed at locations that correspond with visually similar features of the third image.

One embodiment provides a system for presenting images. The system includes one or more processors; and memory storing instructions, the instructions executable by the processor. The instruction include providing for display, using one or more computing devices, a third image of a scene where a first portion of the third image is based at least in part on a first image depicting a first portion of the scene, and where a second portion of the third image is based at least in part on a second image depicting a second portion of the scene; receiving, by the one or more computing devices, an instruction to zoom in the display of the third image; providing for display, by the one or more computing devices, and after zooming starts, the first image when the zoomed-in portion of the third image is the first portion; providing for display, by the one or more computing devices, and after the zooming starts, the second image when the zoomed-in portion of the third image is the second portion. The features of the first and second image may be displayed at locations that correspond with visually similar features of the third image.

Another embodiment provides a system for presenting images. The system includes one or more processors; and memory storing instructions, the instructions executable by the processor. The instructions include displaying a third image of a scene on a device where a first portion of the third image is based at least in part on a first image depicting a first portion of the scene, and where a second portion of the third image is based at least in part on a second image depicting a second portion of the scene; receiving an instruction to zoom in the display of the third image; displaying on the device, and after zooming starts, the first image when the zoomed-in portion of the third image is the first portion; displaying on the device the second image when the zoomed-in portion of the third image is the second portion; receiving a second instruction to pan the display; and panning between the first and second image. The features of the first and second image are displayed at locations that correspond with visually similar features of the third image. Displaying the first or second image includes displaying the first or second image within the third image.

BRIEF DESCRIPTION OF THE DRAWINGS

FIG. 3 is an example of a computing device capturing images in accordance with aspects of the disclosure.

FIG. 4 is an example of the overlap between the images captured by the computing device.

DETAILED DESCRIPTION

Overview

Figure 1:
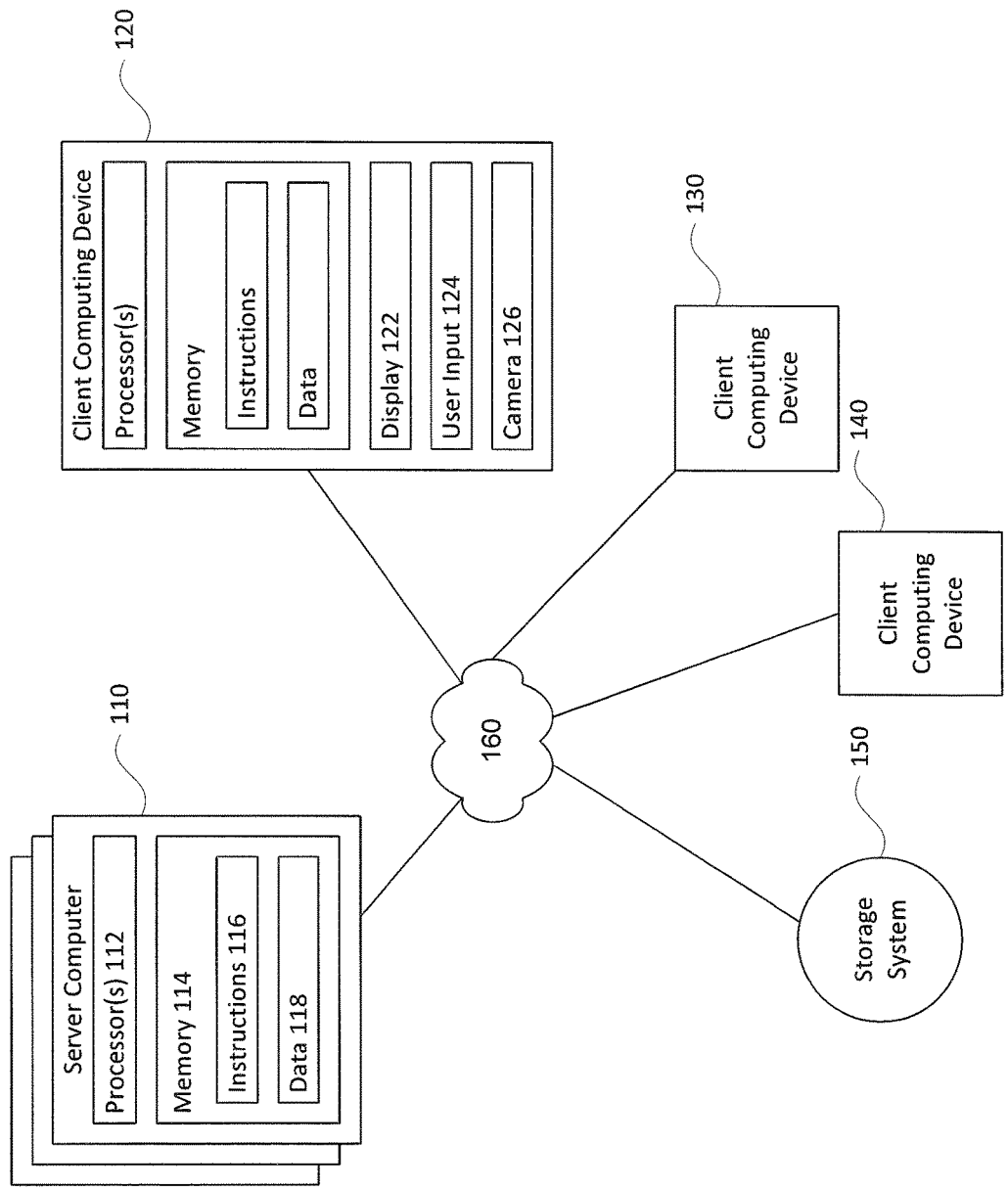
FIG. 1 is a functional diagram of an example system in accordance with aspects of the disclosure.

The technology relates to, by way of example, transitioning between panoramic imagery and the imagery from which the panoramic imagery was generated. For instance, a user may capture different portions of a scene from different angles by taking a sequence of still photos as the user pans a camera. One or more computing devices may combine those images together to form a single panoramic image that captures a larger portion of the scene.

A computing device may also be used to display both the panoramic image and the images from which the panoramic image was generated. For example, when a user zooms into a displayed panoramic image, the device may cause the display to switch from the panoramic image to the still image that corresponds with the zoomed-in portion of the panoramic image. The device may also align the images so that the screen locations of objects in the still image correspond with screen locations of the same objects in the panoramic image. If a user then pans the still image, the display may transition to a second still image that overlaps with the first still image. The transition between the still images may provide parallax-related visual effects that convey a sense of 3D depth.

A user may capture a scene by panning a mobile device equipped with a camera. The scene may be captured in a series of still images, each of which captures a portion of the scene. A computing device may combine the individual still images together to form a single panoramic image. As discussed in more detail below, the device may use a variety of different techniques for combining the images together. For instance, the device may identify features within one image that are visually similar to features in other images, and use those features to identify areas of overlap.

When two still images have captured the same objects, the objects' visual features in one image may be different from the objects' visual features in the other image. When the device combines the still images to generate a single panoramic image, the computing device may modify the resulting image data in order to minimize artifacts resulting from those differences.

A user may use a device to view both the panoramic image and its associated still images. For example the user may view the entire panoramic image on the display of a mobile device. Further, the user may cause the device to zoom into a portion of the panoramic image. As the user zooms into the image, the device may switch from displaying the panoramic image to the still image corresponding with that portion of the panoramic. The still image corresponding with the portion of the panoramic image zoomed into may be embedded within the panoramic image. The images may be aligned so that the screen location of the objects in the still image, correspond with the screen location of those same objects in the panoramic image. If the user zooms out of the still image, the display may switch to the corresponding portion of the panoramic image.

The user may also pan the still image to view other portions of the scene captured by the panoramic image. In this regard, the right side of a still image shown may overlap with the left side of another still image. If the user pans the still image to the area of overlap, the device may switch to displaying the other still image. As the display changes from one still image to another, the screen location of the objects in the foreground may change more than the screen location of the objects in the background and convey a sense of depth to the viewing of panoramic images.

The features described herein may allow for a user to view both a panoramic image and the still images which were used to generate the panoramic image. By doing so, a user may view unaltered still images of portions of a panoramic image. This may cause users to capture more panoramic images and increase user interest in panoramic images in general. In addition, the features may provide performance advantages over other techniques as they convey a sense of depth to users viewing panoramic images.

Example Systems

Figure 2:
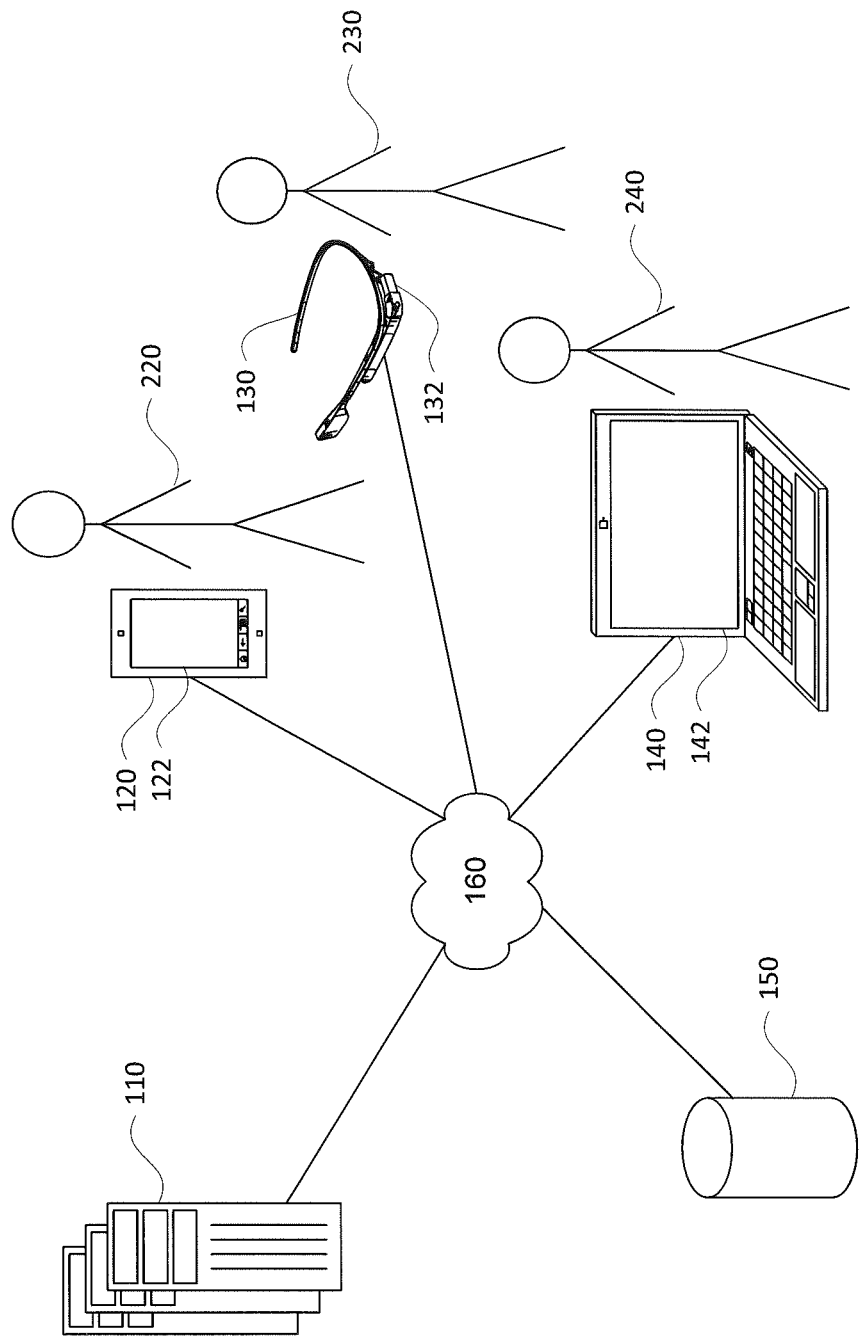
FIG. 2 is a pictorial diagram of the example system of FIG. 1.

FIGS. 1 and 2 include an example system 100 in which the features described above may be implemented. It should not be considered as limiting the scope of the disclosure or usefulness of the features described herein. In this example, system 100 may include computing devices 110, 120, 130, and 140 as well as storage system 150. Each computing device 110 may contain one or more processors 112, memory 114 and other components typically present in general purpose computing devices. Memory 114 of each of computing devices 110, 120, 130, and 140 may store information accessible by the one or more processors 112, including instructions 116 that may be executed by the one or more processors 112.

Memory may also include data 118 that may be retrieved, manipulated or stored by the processor. The memory may be of any non-transitory type capable of storing information accessible by the processor, such as a hard-drive, memory card, ROM, RAM, DVD, CD-ROM, write-capable, and read-only memories.

The instructions 116 may be any set of instructions to be executed directly, such as machine code, or indirectly, such as scripts, by the one or more processors. In that regard, the terms "instructions," "application," "steps" and "programs" may be used interchangeably herein. The instructions may be stored in object code format for direct processing by a processor, or in any other computing device language including scripts or collections of independent source code modules that are interpreted on demand or compiled in advance. Functions, methods and routines of the instructions are explained in more detail below.

Data 118 may be retrieved, stored or modified by the one or more processors 112 in accordance with the instructions 116. For instance, although the subject matter described herein is not limited by any particular data structure, the data may be stored in computer registers, in a relational database as a table having many different fields and records, or XML documents. The data may also be formatted in any computing device-readable format such as, but not limited to, binary values, ASCII or Unicode. Moreover, the data may comprise any information sufficient to identify the relevant information, such as numbers, descriptive text, proprietary codes, pointers, references to data stored in other memories such as at other network locations, or information that is used by a function to calculate the relevant data.

The one or more processors 112 may be any conventional processors, such as a commercially available CPU. Alternatively, the processors may be dedicated components such as an application specific integrated circuit ("ASIC") or other hardware-based processor. Although not necessary, one or more of computing devices 110 may include specialized hardware components to perform specific computing processes, such as decoding video, matching video frames with images, distorting videos, encoding distorted videos, faster or more efficiently.

Although FIG. 1 functionally illustrates the processor 112, memory 114, and other elements of computing device 110 as being within the same block, the processor, computer, computing device, or memory may actually comprise multiple processors, computers, computing devices, or memories that may or may not be stored within the same physical housing. For example, the memory may be a hard drive or other storage media located in housings different from that of the computing devices 110. Accordingly, references to a processor, computer, computing device, or memory will be understood to include references to a collection of processors, computers, computing devices, or memories that may or may not operate in parallel. For example, the computing devices 110 may include server computing devices operating as a load-balanced server farm, distributed system, etc. Yet further, although some functions described below are indicated as taking place on a single computing device having a single processor, various aspects of the subject matter described herein may be implemented by a plurality of computing devices, for example, communicating information over network 160.

Each of the computing devices 110 may be at different nodes of a network 160 and capable of directly and indirectly communicating with other nodes of network 160. Although only a few computing devices are depicted in FIGS. 1-2, it should be appreciated that a typical system may include a large number of connected computing devices, with each different computing device being at a different node of the network 160. The network 160 and intervening nodes described herein may be interconnected using various protocols and systems, such that the network may be part of the Internet, World Wide Web, specific intranets, wide area networks, or local networks. The network may utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

As an example, each of the computing devices 110 may include web servers capable of communicating with storage system 150 as well as computing devices 120, 130, and 140 via the network. For example, one or more of server computing devices 110 may use network 160 to transmit and present information to a user, such as user 220, 230, or 240, on a display, such as displays 122, 132, or 142 of computing devices 120, 130, or 140. In this regard, computing devices 120, 130, and 140 may be considered client computing devices and may perform all or some of the features described herein.

Each of the client computing devices 120, 130, and 140 may be configured similarly to the server computing devices 110, with one or more processors, memory and instructions as described above. Each client computing device 120, 130 or 140 may be a personal computing device intended for use by a user 220, 230, 240, and have all of the components normally used in connection with a personal computing device such as a central processing unit (CPU), memory (e.g., RAM and internal hard drives) storing data and instructions, a display such as displays 122, 132, or 142 (e.g., a monitor having a screen, a touch-screen, a projector, a television, or other device that is operable to display information), and user input device 124 (e.g., a mouse, keyboard, touch-screen or microphone). The client computing device may also include a camera for recording video streams and/or capturing images, speakers, a network interface device, and all of the components used for connecting these elements to one another.

Although the client computing devices 120, 130 and 140 may each comprise a full-sized personal computing device, they may alternatively comprise mobile computing devices capable of wirelessly exchanging data with a server over a network such as the Internet. By way of example only, client computing device 120 may be a mobile phone or a device such as a wireless-enabled PDA, a tablet PC, or a netbook that is capable of obtaining information via the Internet. In another example, client computing device 130 may be a head-mounted computing system. The user may interact with the client computing device, for example, by inputting information using a small keyboard, a keypad, microphone, using visual signals with a camera, or a touch screen.

As with memory 114, storage system 150 may be of any type of computerized storage capable of storing information accessible by the server computing devices 110, such as a hard-drive, memory card, ROM, RAM, DVD, CD-ROM, write-capable, and read-only memories. In addition, storage system 150 may include a distributed storage system where data is stored on a plurality of different storage devices which may be physically located at the same or different geographic locations. Storage system 150 may be connected to the computing devices via the network 160 as shown in FIG. 1 and/or may be directly connected to any of the computing devices 110, 120, 130, and 140 (not shown).

Example Methods

Operations in accordance with a variety of aspects of the invention will now be described. It should be understood that the following operations do not have to be performed in the precise order described below. Rather, various steps can be handled in reverse order or simultaneously.

A user may capture different portions of a scene from different angles by taking a sequence of still photos as the user pans a camera. For example, a user such as user 220 using client computing device 120 may move the computing device in a linear horizontal or vertical motion when capturing a panoramic image. FIG. 3 illustrates an example 300 of a user capturing a scene 360 by panning a client computing device 120 equipped with a camera. In this regard, the computing device 120 may be rotated around axis 370 to switch the field of view of the client computing device 120 equipped with a camera relative towards the scene 360. As the camera rotates through the different fields of view 310 through 350, different portions of the scene 360 may be captured.

As the user pans the camera the scene may be captured in a series of images or a video. Each image or video frame within the video captures a portion of the scene. As shown in example 400 in FIG. 4, still images 410-450 may be captured as the user moves the computing device around an axis 370. As such, each still image 410-450 may correspond to different fields of view 310-350, respectively. The still images 410-450 may depict the scene within the field of view of the computing device 120 at the time the still was captured. The still images 410-450 may be individual frames of the video captured by the user.

One or more computing devices may combine those still images together to form a single panoramic image that captures a larger portion of the scene. As discussed in more detail below, the device may use a variety of different techniques for combining the images together. For instance, the computing device may identify features within one still image that are visually similar to features in other still images, and use those features to identify areas of overlap. As shown in example 500 in FIG. 5, similar features may be detected between still images. For example feature 510 may be detected in still images 410 and 420, and features 520 and 530 may be detected in still images 420 and 430. Accordingly, features 510 may be detected as an area of overlap between still images 410 and 420, and features 520 and 530 may be detected as an area of overlap in still images 420 and 430.

Figure 5:
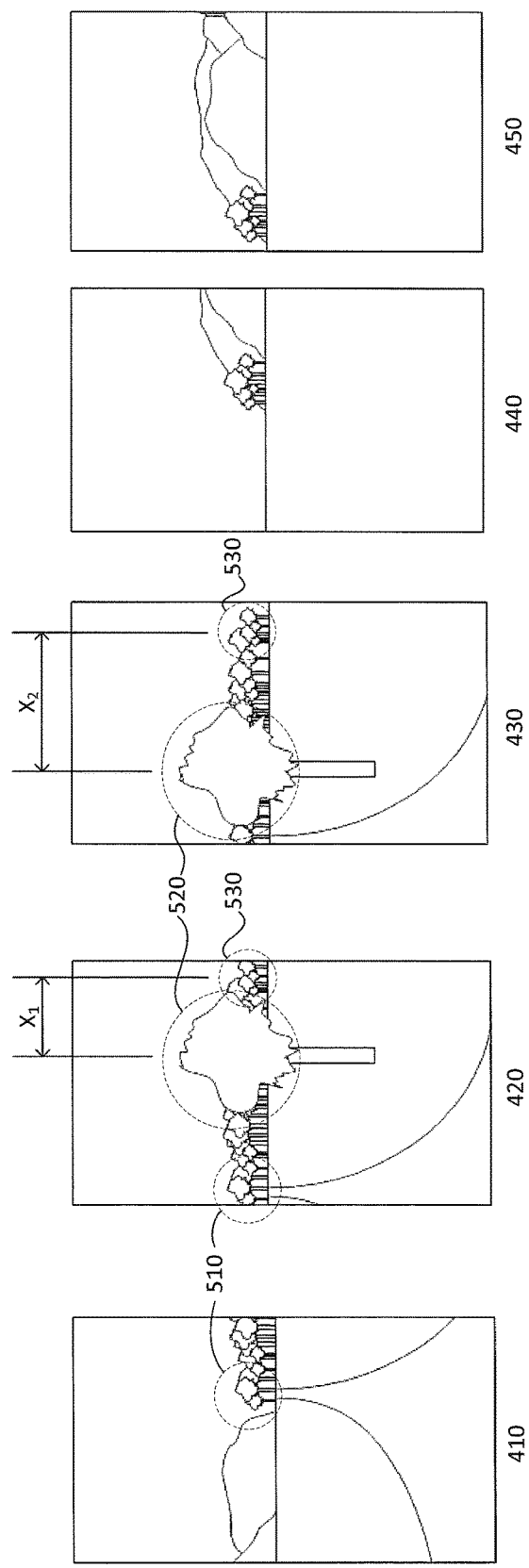
FIG. 5 is an example of matching still images in accordance with aspects of the disclosure.

Even when two still images have captured the same objects, the objects' visual features in one image may be different from the objects' visual features in the other image. For example, as shown in FIG. 5, features 520 and 530 from still image 420 may have a distance relationship of $X_1$. Features 520 and 530 from still image 430 may have a greater distance relationship $X_2$ due to the changed camera angle or a shift in the camera's position. For ease of illustration, only a distance relationship is shown in FIG. 5; however the visual features between objects in one still image may be different from the objects' visual features in the other still image based on height, width, depth, etc. Further, for ease of illustration, the visual features may not be to scale.

When the device combines the still images to generate a single panoramic image, the computing device may modify the resulting image data in order to minimize artifacts resulting from those differences. As shown in example 600 of FIG. 6, still images 420 and 430 may be combined together by overlapping the still images together to minimize the difference in visual features between the two still images. In this regard, a sparse flow field may be calculated between still image 420 and still image 430. For example, the displacement of visual data within the still image 420 and still image 620 may be determined. Based on the displacement, the two images may be warped together. The warped images may then be blended together to smooth out distortions and/or artifacts. Alternatively, the two images may be transformed together by use of homography. For example, the two images may be analyzed to determine a seam where the difference between the two images is minimized. The two images may then be combined and the seam may be blended.

Artifacts and/or distortions such as those shown by 610 may still be present due to the differing visual features between the two still images. In that regard and as shown in example 700 of FIG. 7, the panoramic image's representation of the captured scene may be less accurate than the still image data from which the panoramic image was generated. For example, after the panoramic image 710 is generated, portions of the panoramic image 710 may have distortions and/or errors as shown in the outlined area 730.

Figure 7:
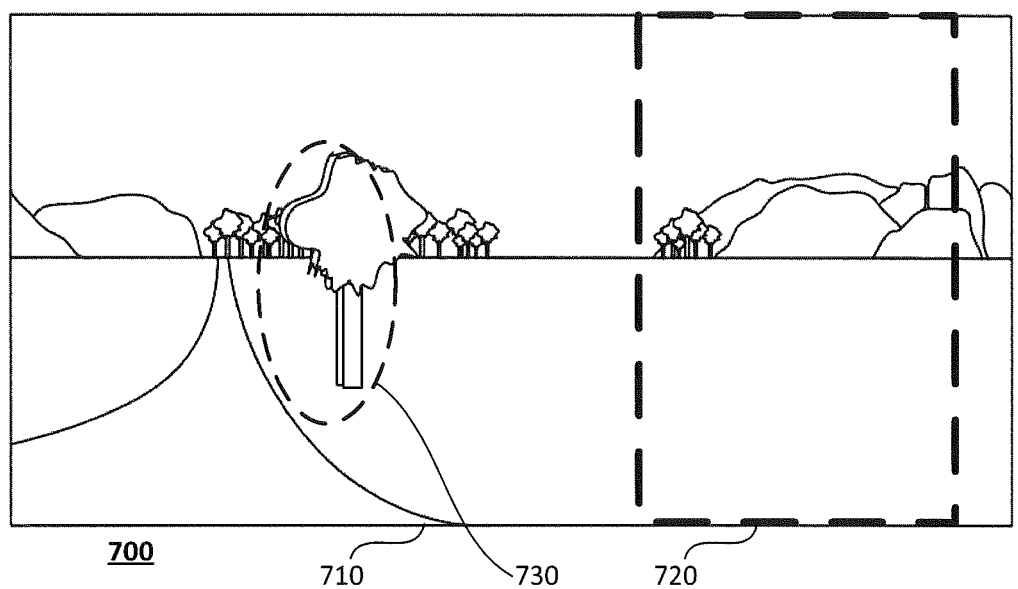
FIG. 7 is an example panoramic image generated from still images in accordance with aspects of the disclosure.

The device may store data associating portions of the panoramic image data with the still image(s) from which each portion was generated. For example, a homography that warps each still image into the panoramic is known and provides the correspondence between the original still images and the panoramic image. In another example, for a panoramic image formed utilizing using sparse flow, the sparse flow field may be computed each image that warps it into the panorama space. Based on the sparse flow field, the correspondence between the original images and the panorama may be determined. As shown in FIG. 7, a portion of the panoramic image data may be associated with a still image 720. The outline portion of the panoramic image 710 may be associated with still image 720 from which the outlined portion of the panoramic image was generated.

Figure 8:
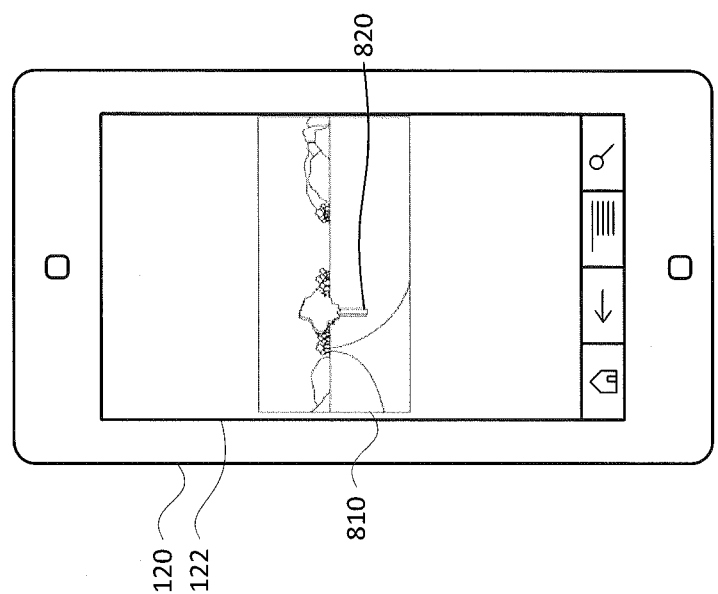
FIG. 8 an example of a panoramic image displayed on a client computing device in accordance with aspects of the disclosure.

A computing device may also be used to display both the panoramic image and the images from which the panoramic image was generated. For example, as shown in example 800 of FIG. 8, the user may view the entire panoramic image on the display of a client computing device 120. For instance, on the display 122 of the client computing device 120, an entire panoramic image 810 may be displayed. The panoramic image may include distortions and/or errors as shown in area 820.

Figure 9:
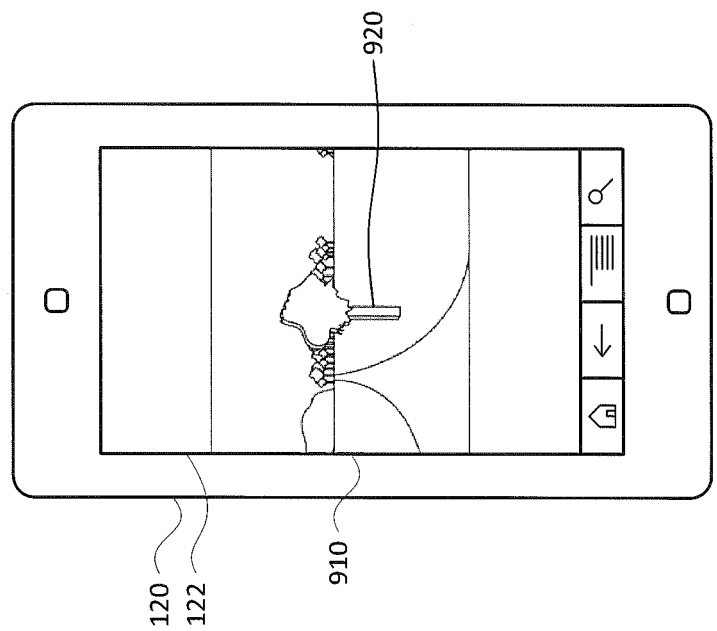
FIG. 9 is an example of a panoramic image displayed on a client computing device in accordance with aspects of the disclosure.

The user may cause the device to zoom into a portion of the panoramic image as well. For example, as shown in example 900 of FIG. 9, a user may zoom into a portion of the panoramic image on the display 122 of a client computing device 120. The display 122 of the client computing device 120 may then display a zoomed-in portion of the panoramic image 910. The zoomed-in portion of panoramic image may include distortions and/or errors as shown in area 920.

As the user zooms into the image the device may switch from displaying the panoramic image to the still image corresponding with that portion of the panoramic. The still image corresponding with the portion of the panoramic image zoomed into may be embedded within the panoramic image. For example, as shown in example 1000 of FIG. 10, as a client computing device 120 may display on a display 122 a panoramic image 1010. As the user zooms into the image the client computing device 120 may switch from displaying only the panoramic image 1010, to displaying both the panoramic image 1010 and the still image 1020 corresponding with that portion of the panoramic image 1010.

Figure 10:
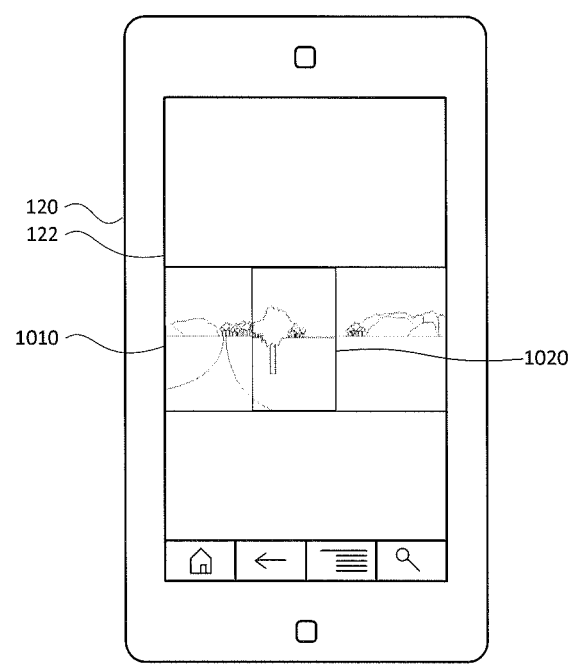
FIG. 10 is an example client computing device and screen shot of a panoramic image with an embedded still image in accordance with aspects of the disclosure.

The panoramic image and the still image corresponding with the portion of the panoramic image being zoomed-in on may be aligned so that the screen location of the objects in the still image, correspond with the screen location of those same objects in the panoramic image. In some aspects, the switch between images may be gradual. For instance, as the zoom increases, the panoramic image data may become increasingly transparent and the still image may become increasingly opaque. For example, as shown in FIG. 10, the objects in still image 1020 align with the objects in the panoramic image 1010.

Figure 11:
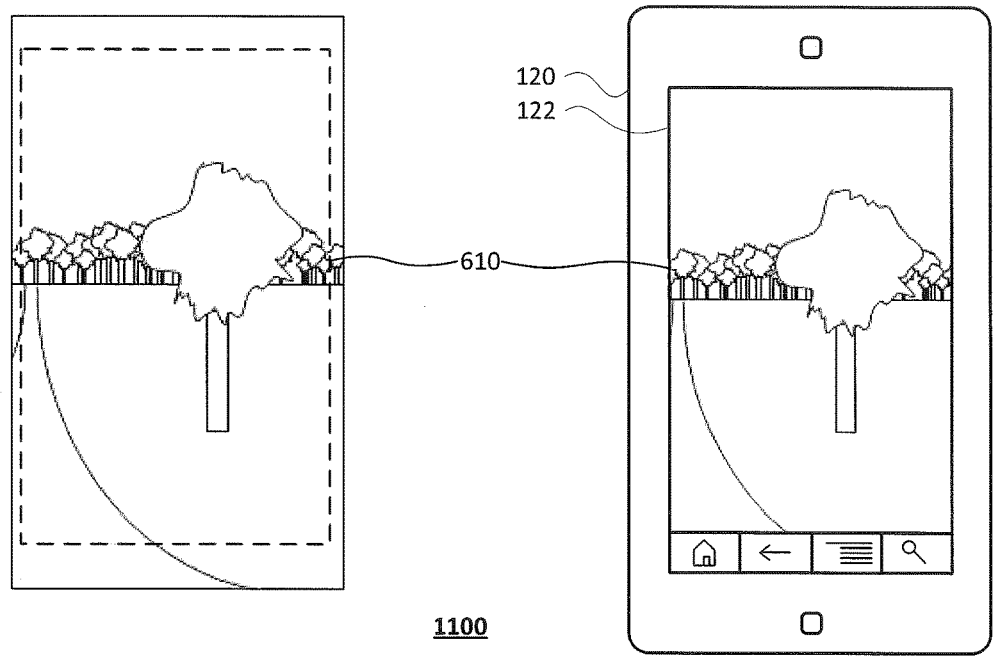
FIG. 11 and FIG. 12 are example still images displayed on a client computing in accordance with aspects of the disclosure.
Figure 12:
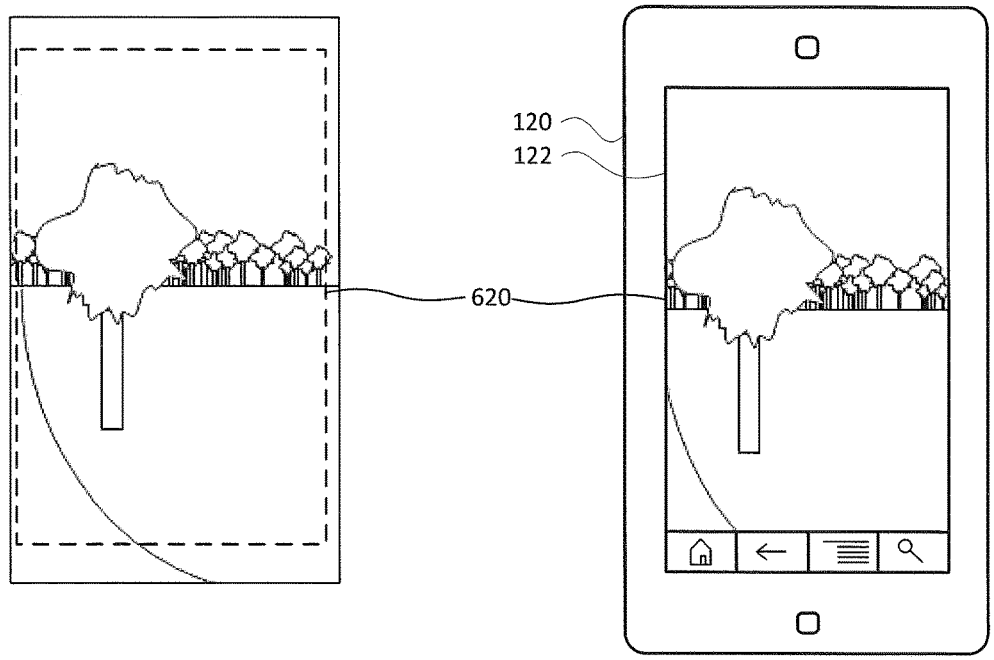

The user may continue to zoom into the still image data and the still image may fill the entire display. If the user zooms out of the still image, the display may switch to the corresponding portion of the panoramic image. As shown example 1100 of FIG. 11, as a user zooms into the panoramic image data, a determination may be made to which still image corresponds with the area being zoomed-in on. The still image associated with the area being zoomed-in on 610 may fill the entire screen of the client computing device 120. Similarly, as shown example 1200 of FIG. 12, as a user zooms into a panoramic image data, the still image associated with the area being zoomed-in on 620 may fill the entire screen of the client computing device 120.

Figure 6:
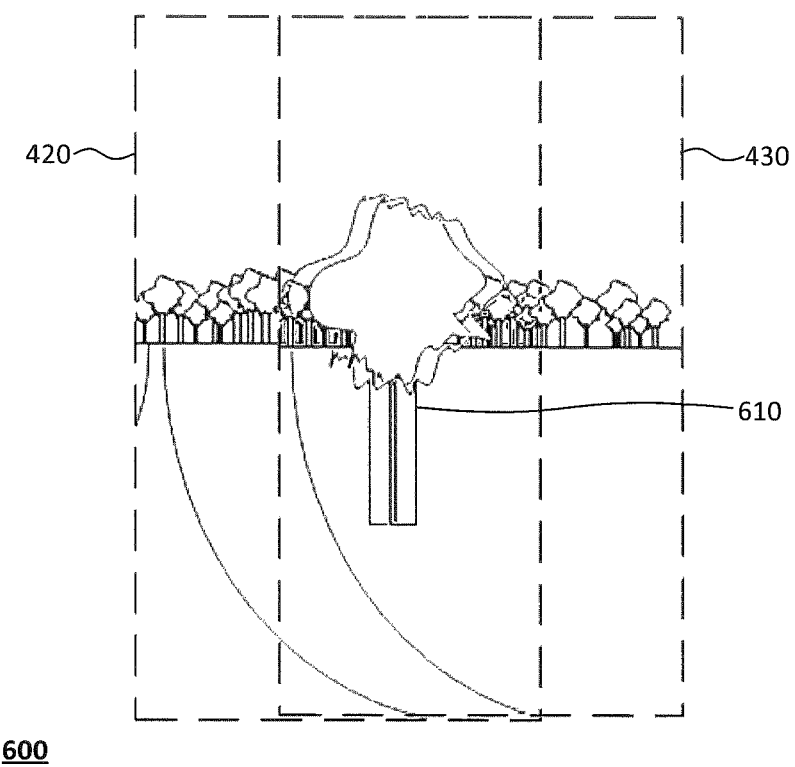
FIG. 6 is an example of overlapping still images in accordance with aspects of the disclosure.

The user may also pan the still image to view other portions of the scene captured by the panoramic image. In this regard, the display may transition to a second still image that overlaps with the first still image. The transition between the still images may provide parallax-related visual effects that convey a sense of 3D depth. By way of example and as shown in FIG. 6, the right side of the still image 610 displayed in FIG. 11 overlaps with the left side of the still image 620 shown and displayed in FIG. 12. If the user pans the image 610 in FIG. 11 to the area of overlap, the device may switch to displaying the image 620 of FIG. 12. Similar to the transition from the panoramic image to the still image described above, the transition may be gradual. Moreover, as the display changes from one still image to another, the screen location of the objects in the foreground may change more than the screen location of the objects in the background and convey a sense of depth to the viewing of panoramic images. In this regard, the still images may be rendered together using a sparse flow field or homography.

In some examples, a user may zoom into a portion of the panoramic image which is associated with two or more still images. Accordingly, the two or more still images associated with the portion of the panoramic image zoomed into may be rendered together using a sparse flow field or homography. Alternatively, a single still image of the two or more still images may be selected and displayed.

Figure 13:
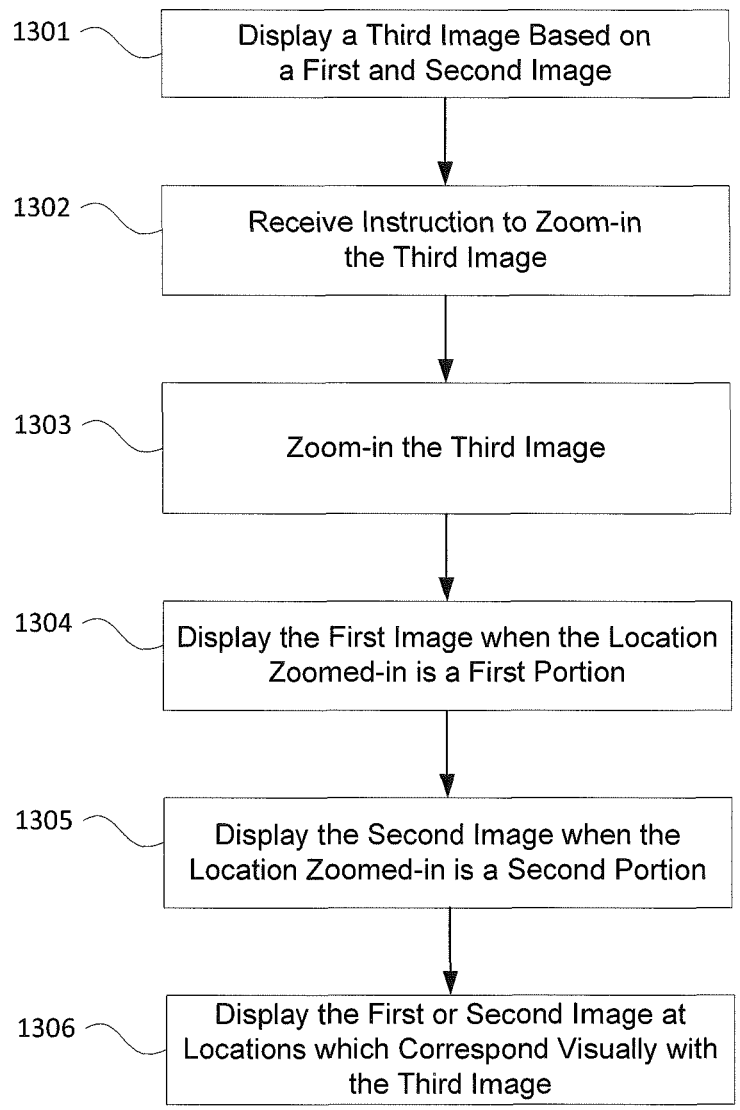
FIG. 13 is a flow diagram in accordance with aspects of the disclosure.

Flow diagram 1300 of FIG. 13 is an example flow diagram of some of the aspects described above that may be performed by one or more computing devices such as client computing devices 120, 130, or 140. It will be understood that the steps discussed herein are merely an example; the steps may occur in a different order, steps may be added, and steps may be omitted. In this example, at block 1301 a third image may be displayed on a client computing device. As noted above, the third image may be a panoramic image comprising a first and second image. While displaying the third image, at block 1302, a user instruction may be received to zoom-in on the third image. After the instruction to zoom-in on the third image is received, the third image may be zoomed-in on as shown in block 1303. If further user instructions to zoom-in on the third image are received a first image may be displayed if the first image is of the location being zoomed-in on as shown in block 1304. Alternatively, if the user instructions to zoom-in on the third image are received a second image may be displayed if the second image is of the location being zoomed-in on as shown in block 1305. Depending on the image being zoomed-in on, either image one or image two may be displayed as shown in block 1306.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method for presenting images, comprising:
generating, with one or more processors, a third image of a scene by combining an altered first image depicting a first portion of the scene and an altered second image depicting a second portion of the scene;
displaying the third image of the scene on a device where a first portion of the third image is based at least in part on the altered first image and where a second portion of the third image is based at least in part on the altered second image;
receiving an instruction to zoom into the display of the third image;
zooming, with the one or more processors, into a portion of the third image;
orienting, with the one or more processors when the zoomed-in portion of the third image is the first portion, an unaltered first image with the third image by aligning screen locations of objects in the unaltered first image to correspond with scene locations of the objects in the third image;
displaying on the device, with the one or more processors, the unaltered first image when the zoomed-in portion of the third image is the first portion, by replacing the first portion of the third image with the oriented unaltered first image;
orienting, with the one or more processors when the zoomed-in portion of the third image is the second portion, an unaltered second image with the third image by aligning screen locations of objects in the unaltered second image to correspond with scene locations of the objects in the third image; and
displaying on the device, with the one or more processors, the unaltered second image when the zoomed-in portion of the third image is the second portion, by replacing the second portion of the third image with the oriented unaltered second image.

2. The method of claim 1, wherein the third image comprises at least one additional portion, and the at least one additional portion is based at least in part on an altered fourth image depicting the at least one additional portion of the scene.

3. The method of claim 1, wherein receiving an instruction includes receiving input, from a user, through at least one input device.

4. The method of claim 1, wherein displaying the unaltered first or unaltered second image includes displaying the unaltered first or unaltered second image within the third image.

5. The method of claim 4, wherein displaying the unaltered first or unaltered second image includes displaying both, the unaltered first and unaltered second images.

6. The method of claim 5, wherein the altered first and altered second images are warped together using a sparse-flow field.

7. The method of claim 5, wherein the altered first and altered second images are blended together with homography.

8. The method of claim 1, wherein displaying the unaltered first or unaltered second image includes displaying only the unaltered first or unaltered second image.

9. The method of claim 1, further including:
receiving a second instruction to pan the display; and
panning, with the one or more processors, between the unaltered first and unaltered second images,
wherein the altered first and altered second image are warped together using a sparse-flow field or the altered first and altered second image are blended together with homography.

10. The method of claim 1, further including:
determining, with the one or more processors, tracking points including one or more features that appear in the unaltered first and unaltered second images;
determining a flow of the tracking points between the unaltered first and unaltered second images; and
generating the third image by warping the altered first and altered second images together based on the determined flow, and/or transforming the altered first and altered second images together and blending the transformed altered first and altered second images.

11. A system for presenting images, comprising:
one or more computing devices; and
memory storing instructions, the instructions executable by the one or more computing devices;
wherein the instructions comprise:
generating, using the one or more computing devices, a third image of a scene by combining an altered first image depicting a first portion of the scene and an altered second image depicting a second portion of the scene;
providing for display, using the one or more computing devices, the third image of the scene where a first portion of the third image is based at least in part on the altered first image and where a second portion of the third image is based at least in part on the altered second image;
receiving, by the one or more computing devices, an instruction to zoom into the display of the third image;
zooming, with the one or more computing devices, into a portion of the third image;
orienting, with the one or more computing devices when the zoomed-in portion of the third image is the first portion, an unaltered first image with the third image by aligning screen locations of objects in the unaltered first image to correspond with scene locations of the objects in the third image;
providing for display, by the one or more computing devices, the unaltered first image when a zoomed-in portion of the third image is the first portion, by replacing the first portion of the third image with the oriented unaltered first image;
orienting, with the one or more computing devices when the zoomed-in portion of the third image is an unaltered second portion, the second image with the third image by aligning screen locations of objects in the unaltered second image to correspond with scene locations of the objects in the third image; and
providing for display, by the one or more computing devices, the unaltered second image when the zoomed-in portion of the third image is the second portion, by replacing the second portion of the third image with the oriented unaltered second image.

12. The system of claim 11, wherein the third image comprises at least one additional portion, and the at least one additional portion is based at least in part on an altered fourth image depicting the at least one additional portion of the scene.

13. The system of claim 11, wherein displaying the unaltered first or unaltered second image includes displaying the unaltered first or unaltered second image within the third image.

14. The system of claim 13, wherein displaying the unaltered first or unaltered second image includes displaying both, the unaltered first and unaltered second images.

15. The system of claim 11, wherein the instructions further comprise:
receiving, by the one or more computing devices, a second instruction to pan the display; and
panning, by the one or more computing devices, between the unaltered first and unaltered second image,
wherein the altered first and altered second image are warped together using a sparse-flow field or the altered first and altered second image are blended together with homography.

16. The system of claim 11, wherein the instructions further comprise:
determining, by the one or more computing devices, tracking points including one or more features that appear in the unaltered first and unaltered second images;
determining, by the one or more computing devices, a flow of the tracking points between the unaltered first and unaltered second images; and
warping the altered first and altered second images together based on the determined flow to generate the third image, and/or transforming the altered first and altered second images together and blending the transformed image.

17. A system for presenting images, comprising:
one or more computing devices; and
memory storing instructions, the instructions executable by the one or more computing devices;
wherein the instructions comprise:
generating a third image of a scene by combining an altered first image depicting a first portion of the scene and an altered second image depicting a second portion of the scene;
displaying the third image of the scene on a device where a first portion of the third image is based at least in part on the altered first image and where a second portion of the third image is based at least in part on the altered second image;
receiving an instruction to zoom into the display of the third image;
zooming into a portion of the third image;
orienting, when the zoomed-in portion of the third image is the first portion, an unaltered first image with the third image by aligning screen locations of objects in the unaltered first image to correspond with scene locations of the objects in the third image;
displaying on the device, the unaltered first image when a zoomed-in portion of the third image is the first portion, by replacing the first portion of the third image with the oriented unaltered first image;
orienting, when the zoomed-in portion of the third image is the second portion, an unaltered second image with the third image by aligning screen locations of objects in the unaltered second image to correspond with scene locations of the objects in the third image;
displaying on the device the unaltered second image when the zoomed-in portion of the third image is the second portion, by replacing the second portion of the third image with the oriented unaltered second image;
receiving a second instruction to pan the display; and
panning between the unaltered first and unaltered second image;
wherein features of the unaltered first and unaltered second image are displayed at locations that correspond with visually similar features of the third image; and
wherein displaying the unaltered first or unaltered second image includes displaying the unaltered first or unaltered second image within the third image.

18. The system of claim 17, wherein the system is a mobile device.

19. The system of claim 17, wherein displaying the unaltered first or unaltered second image includes displaying both, the unaltered first and unaltered second images.

20. The system of claim 17, wherein the third image comprises at least one additional portion, and the at least one additional portion is based at least in part on an altered fourth image depicting the at least one additional portion of the scene.

* * * * *